United States Patent [19]

Setteducati

[11] Patent Number: 4,948,241
[45] Date of Patent: Aug. 14, 1990

[54] DEVICE FOR CREATING A VARIETY OF VISUAL IMAGES

[75] Inventor: Mark Setteducati, New York, N.Y.
[73] Assignee: Tedco, Inc., Hagerstow, Ind.
[21] Appl. No.: 167,247
[22] Filed: Mar. 11, 1988
[51] Int. Cl.[5] ............................................. G02B 27/08
[52] U.S. Cl. ..................................... 350/618; 350/4.1; 350/617
[58] Field of Search ................. 350/4.1, 4.2, 600, 602, 350/618, 616, 617

[56] References Cited

U.S. PATENT DOCUMENTS

| | | |
|---|---|---|
| 718,326 | 1/1903 | Diem . |
| 1,110,296 | 9/1914 | Wiley . |
| 1,518,204 | 12/1924 | Husted .................................. 350/4.2 |
| 1,662,743 | 3/1928 | Hanson ................................. 350/4.2 |
| 1,729,472 | 9/1929 | Behning . |
| 2,381,801 | 8/1945 | Bloxom . |
| 2,430,318 | 11/1947 | Zimmerman . |
| 2,483,901 | 10/1949 | Harris . |
| 3,357,768 | 12/1967 | Cox et al. . |
| 3,603,663 | 9/1971 | Lewis . |
| 3,642,342 | 2/1972 | De Larrain .......................... 350/4.1 |
| 3,809,879 | 5/1974 | Gonzalez . |
| 3,860,324 | 1/1975 | Gonzalez ............................. 350/4.2 |
| 4,040,716 | 8/1977 | Matsubara . |
| 4,277,139 | 7/1981 | Cox . |
| 4,776,653 | 10/1988 | Kaplan ................................ 350/4.1 |

FOREIGN PATENT DOCUMENTS 219883 8/1924 United Kingdom .

*Primary Examiner*—Bruce Y. Arnold
*Assistant Examiner*—Martin Lerner
*Attorney, Agent, or Firm*—Woodard, Emhardt, Naughton, Moriarty & McNett

[57] ABSTRACT

A device for creating a variety of visual images includes a pyramidal body which defines a cavity having three identical triangular walls intersecting each other at an angle of 90°. The pyramidal body is provided with an uninterrupted reflective coating. A grease-type pencil or crayon, templates and various objects are provided for the creation of an infinite variety of visual images therein.

16 Claims, 1 Drawing Sheet

DEVICE FOR CREATING A VARIETY OF VISUAL IMAGES

Field of the Invention

Present invention relates to the field of image creation devices and more particularly to a device for the manual creation of an infinite variety of visual images.

Background of the Invention

A variety of novelty devices exist wherein the device is manipulated shaken, thrown, cooked, mixed with water, powered by an electrical source, stretched or merely looked at to produce some form of unusual effect. One type of device uses mirrors to multiply the appearance of an object or objects thereby producing a kaleidoscope effect. Most such devices, developed for advertisement or amusement, employ or require slots, cut-outs, belts, pulleys, support frames, pivoting members, lights, viewing shrouds and prisms to achieve some type of mirror-enhanced effect. Examples of such devices are disclosed in the following U.S. Patents:

| Patent No. | Inventor |
| --- | --- |
| 4,277,139 | Cox |
| 4,040,716 | Matsubara |
| 3,809,879 | Gonzalez |
| 3,603,663 | Lewis |
| 3,357,768 | Cox et al, |
| 2,483,901 | Harris |
| 2,430,318 | Zimmerman |
| 2,381,801 | Bloxom |
| 1,729,472 | Behning |
| 1,110,296 | Wiley |
| 718,326 | Diem |
| 219,883 | Perry |

The images producible by the majority of these devices are limited by the pre-existing objects and pictures which are either provided with the device or which are to be added by the operator thereof. They do not permit the infusion of the full expression of the operator. Rather, they simply produce the image they produce when the object or objects are placed near or against the array of two or more generally rectangular-shaped mirrors.

Summary of the Invention

One embodiment of this invention might involve a device for creating an infinite variety of removable visual images within a framed enclosure. A baseless three-walled pyramid has slightly roughened but glossy, interior reflective surfaces which removably receive the images drawn thereupon by a writing implement such as a grease pencil or crayon. Templates are provided to aid in the production of various images. Other objects are also provided for arrangement within the pyramid.

It is an object of the present invention to provide a device for creating images which is uncomplicated and inexpensive.

It is another object of the present invention to provide an image creation device which allows the operator to create an infinite variety of visual images.

Further objects and advantages of the present invention will become apparent from the following description of the preferred embodiment.

Description of the Preferred Embodiment

Figure 1:
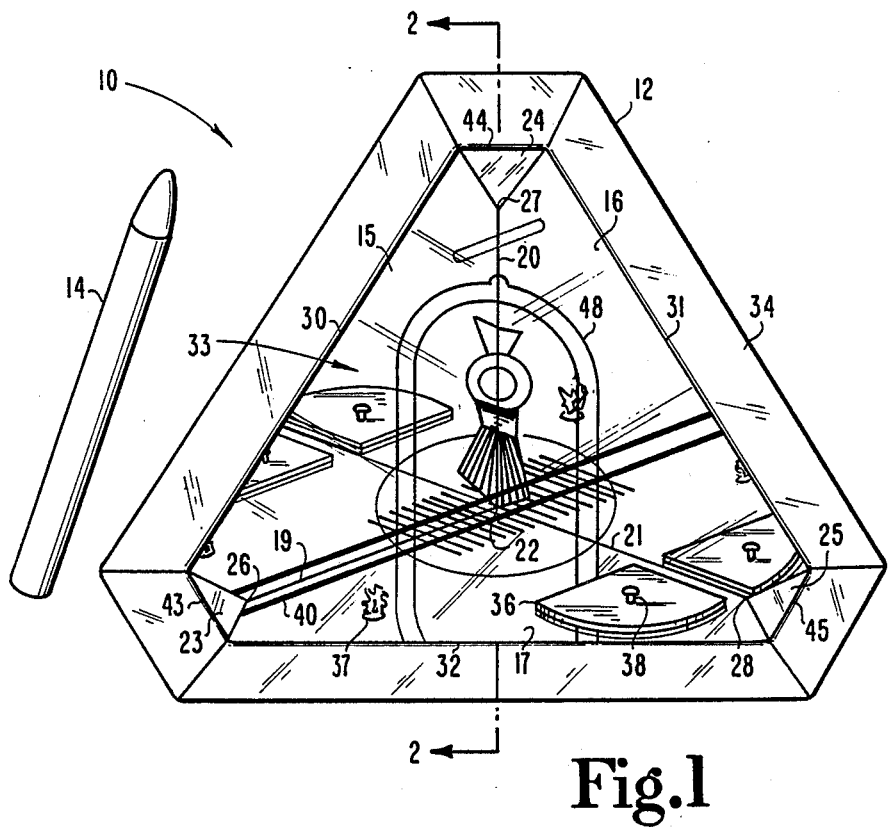
FIG. 1 is a front perspective view of the device for creating images in accordance with the preferred embodiment of the present invention.

For the purposes of promoting an understanding of the principles of the invention, reference will now be made to the embodiment illustrated in the drawings an specific language will be used to describe the same.

Figure 2:
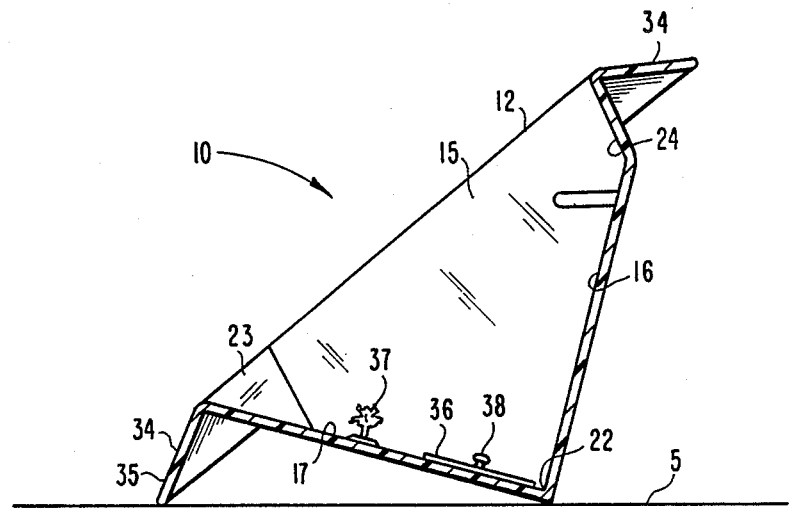
FIG. 2 is a side cross-sectional view of the device for creating images of FIG. 1 taken along the lines 2—2.

Referring now to FIGS. 1 and 2, there is shown a device 10 for creating images in accordance with the preferred embodiment of the present invention. Device 10 includes a baseless inverted pyramid body 12 and a writing implement 14. Pyramid body 12 is a unitary molded plastic body which has three identical walls 15, 16 and 17 which intersect to form 90° angles with each other at edges 19, 20 and 21. Walls 15, 16 and 17 define a pyramidal cavity 33. Edges 19, 20 and 21 intersect at their inner ends at common vertex 22. Pyramid body 12 also defines three identical isosceles triangular planar subsurfaces 23, 24 and 25, each having a vertex 26, 27 and 28 lying on the outer end of edges 19, 20 and 21, respectively. Each subsurface (23 for example) forms an equal obtuse angle with the adjacent walls (15 and 17). In the preferred embodiment, each subsurface (23) forms an angle of 125° with the adjacent walls (15 and 17).

Walls 15, 16 and 17 each substantially define an isosceles triangle, the distance from the common vertex 22 to each vertex 26, 27 and 28 being identical. Base legs 30, 31 and 32 of triangular walls 15, 16 and 17 thus substantially form an equilateral triangular frame for the image created on walls 15, 16 and 17.

A continuous framing band 34 surrounds walls 15, 16 and 17 and subsurfaces 23, 24 and 25. Band 34 has a constant width extending from base legs 30, 31 and 32 and from base legs 43, 44 and 45 of subsurfaces 23, 24 and 25, respectively.

The symmetry of pyramid body 12 allows it to be set on a flat surface 5 with any of the walls 15, 16 and 17 acting as the lower, base or floor portion of the device. Framing band 34 extends outwardly at a 90° angle from each wall 15 16 and 17. The portion 35 of frame band 34 which is adjacent the floor wall (17 in FIG. 2) acts as a front support so that device 10 will sit upon surface 5 in a tilted or display position.

Pyramid body 12 is a single piece of molded plastic. The forwardly facing portions of pyramid body 12 (those visible in FIG. 1 and facing generally upwardly and to the left in FIG. 2) are coated with a conventional glossy, silvery coating to provide a mirrored effect. Such coating material and process is well known in the field of plastic model manufacturing.

Device 10 further includes image producing implement such as a grease-based pencil or crayon 14, one or more templates 36, and one or more objects 37. In the preferred embodiment, grease-based pencil 14 is a water soluble painting crayon commercially available at art supply retailers. Also in the preferred embodiment, device 10 is provided with a variety of crayons 14 of various colors. Template 36 is provided with a knob 38 for manual manipulation thereof. Template 36 is one of a variety of templates having specific geometric shapes to permit manual tracing by crayon 14. Object 37 is one of a variety of objects simulating bushes, trees, rocks, buildings, etc. Objects 37 can be manually arranged and placed within pyramidal cavity 33.

Device 10 is used as follows: Using a template 36 or drawing freehandedly, the user or operator will apply images to one or any of the chrome or reflective coated surfaces such as walls 15, 16 and 17 with the grease crayon 14. By applying one thick, straight line 40 and multiple crossing lines upon wall 17, for example, the multiple reflection effect of reflective coated walls 15, 16 and 17 will simulate a pair of railroad tracks (FIG. 1). Drawing a portion of a train and archway onto wall 16 will simulate a tunnel and train emerging therefrom. Another figure that can be created is the commercial toy gyroscope with its intersecting circles arranged at right angles to one another. Because of the construction of the present device the user can move his head from side to side and the three-dimensional picture of the gyroscope appears real.

Other such examples can be conceived. Using multi-colored grease crayons 14, templates 36 and objects 37, the user may create an infinite variety of visual. multi-dimensional images in cavity 33, all framed by continuous band 34. The final object may then be set for display (FIG. 2) or it may be quickly erased with a damp cloth in preparation for another creation.

The particular surface texture of pyramid body 12 will effect the final surface texture of the coating applied thereon. A slightly roughened coating can produce a surrealistic final image upon application of the grease pencil, while a perfectly smooth surface will provide a sharper image.

The interrelationship of the adjacent triangular wall 15, 16 and 17 contributes to the creation of novel and surrealistic visual effects. Drawing on just one surface 17, such as line 40, figuratively produces a realistic three-dimensional train track which extends beyond the single wall upon which it is drawn, but within the reflection-created platform of the device. Drawing on arc 48 on a second wall 16 creates a literal three-dimensional image in a train track and tunnel entrance. Drawing on yet the third surface 15 enhances the overall image to the point where the mind either sees a complete, three-dimensional picture or questions just what is being seen or how it is being projected. Placement of various objects within the cavity further enhances the effect.

In an alternative embodiment, other image-creating means may be provided, such as paints or stickers. Alternatively, the plastic may be impregnated with a ferromagnetic material and magnetic objects may be provided for random arrangement on pyramid body 12.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for creating a variety of visual images, comprising:

three substantially identical triangular walls having a common vertex, any two of said walls sharing a common edge, said walls each having inner reflective surfaces which mutually define a pyramidal reflective cavity;

image creating means for manually applying a variety of visible images directly to the inner surface of any of said three walls;

each of said walls being orthogonal to the other of said walls; and the image creating means including a writing implement and including said walls having inner reflective surfaces which removably retain the images applied thereon by said writing implement.

2. The device for creating a variety of visual images of claim 1 wherein the writing implement is a grease-type pencil.

3. A device for creating a variety of visual images, comprising:

three substantially identical triangular walls having a common vertex, any two of said walls sharing a common edge, said walls each having inner reflective surfaces which mutually define a pyramidal reflective cavity;

image creating means for manually applying a variety of visible images directly to the inner surface of any of said three walls;

each of said walls being orthogonal to the other of said walls; and wherein at least one triangular planar subsurface has an inner reflective surface which intersects a pair of said walls and has a first vertex intersected by the common edge between the pair of said walls.

4. The device for creating a variety of visual images of claim 3 wherein the reflective surface of the subsurface forms equal obtuse angles with the reflective surfaces of the pair of said walls.

5. A device for creating a variety of visual images, comprising:

three substantially identical triangular walls having a common vertex, any two of said walls sharing a common edge, said walls each having inner reflective surfaces which mutually define a pyramidal reflective cavity;

image creating means for manually applying a variety of visible images directly to the inner surface of any of said three walls;

each of said walls being orthogonal to the other of said walls; and wherein each of said walls has an outer edge which does not intersect said common vertex, the device for creating a variety of visual images further including a continuous peripheral band extending outwardly from the outer edges, said band having a reflective surface merging uninterruptedly with the reflective surfaces of said walls.

6. The device for creating a variety of visual images of claim 5 wherein the reflective surface of said band forms a constant angle with the reflective surfaces of the walls of between 240° and 300°.

7. A device for creating a variety of visual images comprising:

three planar walls, each having a reflective surface, any two of said surfaces mutually intersecting at 90° and forming one of three inner edges, the three inner edges intersecting at a common vertex, the three surfaces forming an interior reflective pyramidal cavity; and image creating means for manually applying a variety of visible images directly to the inner surface of any of said three walls; and wherein the image creating means includes a writing implement and includes said walls having reflective surfaces which removably retain the images applied thereon by said writing implement.

8. A device for creating a variety of visual images comprising:
 a three walled, baseless pyramid body which defines an interior pyramidal cavity having an inner reflective surface;
 image creating means for manually removably applying a variety of visible images upon the interior surfaces; and wherein
 said walls mutually intersect to define three mutually orthogonal edges having inner and outer ends, the edges mutually intersecting at their inner ends at a common vertex and wherein the device for creating a variety of visual images further includes at least one isosceles triangular subsurface which intersects two of the walls and has a first vertex lying on the outer end of the edge between said two of the walls.

9. The device for creating a variety of visual images of claim 8 wherein there is one of said subsurfaces at the outer end of each of said edges.

10. A device for creating a variety of visual images comprising:
 a three walled, baseless pyramid body which defines an interior pyramidal cavity having an inner reflective surface;
 image creating means for manually removably applying a variety of visible images upon the interior surfaces; and wherein
 the image creating means includes a writing implement and wherein the inner reflective surface removably retains the images applies thereon by said writing implement.

11. The device for creating a variety of visual images of claim 10 wherein the writing implement is a grease-type pencil and wherein the walls constitute a unitary plastic body.

12. A device for creating a variety of visual images comprising:
 a three walled, baseless pyramid body which defines an interior pyramidal cavity having an inner reflective surface;
 image creating means for manually removably applying a variety of visible images upon the interior surfaces; and wherein
 each of said walls has an outer edge which does not intersect said common vertex, the device for creating a variety of visual images further including a continuous peripheral band extending outwardly from the outer edges, said band having a reflective surface merging uninterruptedly with the inner reflective surface and wherein the reflective surface of said band forms a constant angle with the inner reflective surface of between 240° and 300°.

13. A method for creating a variety of visual images comprising the steps of:
 providing a three-walled, baseless pyramid body defining an interior pyramidal cavity having three inner walls which define an inner pyramidal reflective surface;
 providing a writing implement; and
 drawing on any two inner walls of said pyramid body with said writing implement.

14. The method for creating a variety of visual images of claim 13 wherein said providing a three-walled, baseless pyramid body step includes making said pyramid body a unitary plastic body and wherein the writing implement is a grease type pencil.

15. The method for creating a variety of visual images of claim 13 further including the step of providing various geometric shapes and arranging the shapes within said pyramid body.

16. The method for creating a variety of visual images of claim 13 wherein the drawing step includes drawing on all three inner walls.

* * * * *